(12) United States Patent
Wahla et al.

(10) Patent No.: US 10,824,367 B2
(45) Date of Patent: Nov. 3, 2020

(54) ADAPTIVE INTRUSION DETECTION BASED ON MONITORED DATA TRANSFER COMMANDS

(71) Applicant: Seagate Technology LLC, Cupertino, CA (US)

(72) Inventors: Muhammad Jawad Alam Wahla, Singapore (SG); Monty Aaron Forehand, Loveland, CO (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 15/788,432

(22) Filed: Oct. 19, 2017

(65) Prior Publication Data

US 2019/0121571 A1 Apr. 25, 2019

(51) Int. Cl.
*G06F 3/06* (2006.01)
*G06F 12/14* (2006.01)
*G06F 21/55* (2013.01)
*G06F 21/74* (2013.01)
*G06F 11/30* (2006.01)

(52) U.S. Cl.
CPC ............ *G06F 3/0655* (2013.01); *G06F 3/061* (2013.01); *G06F 3/0679* (2013.01); *G06F 12/14* (2013.01); *G06F 12/1416* (2013.01); *G06F 12/1433* (2013.01); *G06F 21/55* (2013.01); *G06F 21/552* (2013.01); *G06F 21/74* (2013.01); *G06F 11/30* (2013.01); *G06F 11/3003* (2013.01); *G06F 12/1425* (2013.01)

(58) Field of Classification Search
None
See application file for complete search history.

(56) References Cited

U.S. PATENT DOCUMENTS

| | | | |
|---|---|---|---|
| 5,842,002 A | 11/1998 | Schnurer et al. |
| 6,108,583 A | 8/2000 | Schneck et al. |
| 7,079,020 B2 | 7/2006 | Stilp |
| 7,203,962 B1 | 4/2007 | Moran |
| 7,383,578 B2 | 6/2008 | Blake et al. |

(Continued)

OTHER PUBLICATIONS

Vishal Mier and Yongdae Kim, "Securing Distributed Storage: Challenges, Techniques, and Systems," Storage SS '05, Nov. 11, 2005, pp. 9-25, Virginia, USA.

(Continued)

*Primary Examiner* — Sean D Rossiter
*Assistant Examiner* — Stephanie Wu
(74) *Attorney, Agent, or Firm* — Hall Estill Attorneys at Law

(57) ABSTRACT

Apparatus and method for data security using adaptive selection of intrusion traps in relation to workload. In some embodiments, a data storage device has a non-volatile memory (NVM). A device controller circuit services data transfer commands received from a host device to transfer data between the host device and the NVM. A security controller circuit monitors the received data transfer commands and enacts a change in security policy to implement one or more intrusion traps associated with the NVM in response to the received data transfer commands. The intrusion traps constitute memory locations that are configured to normally store user data, but are not normally accessed during the servicing of the currently received data transfer commands.

20 Claims, 6 Drawing Sheets

(56) References Cited

U.S. PATENT DOCUMENTS

| | | |
|---|---|---|
| 7,424,735 B2 | 9/2008 | Sorkin et al. |
| 7,434,068 B2 | 10/2008 | Nguyen et al. |
| 7,506,379 B2 | 3/2009 | Abali et al. |
| 7,594,111 B2 | 9/2009 | Kiriansky et al. |
| 7,926,104 B1 | 4/2011 | Sundaram et al. |
| 7,936,682 B2 | 5/2011 | Singh et al. |
| 8,380,905 B2 | 2/2013 | Djabbari et al. |
| 8,549,640 B2 | 10/2013 | Lyle et al. |
| 8,667,581 B2 | 3/2014 | Steeves et al. |
| 8,683,547 B2 | 3/2014 | Apparao et al. |
| 8,867,161 B2 | 10/2014 | Emo et al. |
| 8,955,125 B2 | 2/2015 | Brown et al. |
| 9,009,829 B2 | 4/2015 | Stolfo et al. |
| 9,171,157 B2 | 10/2015 | Flores et al. |
| 9,330,715 B1 | 5/2016 | Lee |
| 9,398,014 B2 | 7/2016 | Hewitt et al. |
| 9,401,927 B2 | 7/2016 | Shulman et al. |
| 2004/0168173 A1 | 8/2004 | Cohen et al. |
| 2006/0015680 A1* | 1/2006 | Otsuka ............... G06F 11/1456 711/111 |
| 2008/0016572 A1 | 1/2008 | Burkhardt et al. |
| 2008/0022396 A1* | 1/2008 | Kado ................ G06F 12/1441 726/19 |
| 2009/0282482 A1* | 11/2009 | Huston ............... H04L 63/1416 726/23 |
| 2012/0311233 A1* | 12/2012 | Weingarten ......... G06F 12/0246 711/103 |
| 2013/0198437 A1* | 8/2013 | Omizo ............... G06F 12/0246 711/103 |
| 2013/0263242 A1* | 10/2013 | Jain ....................... G06F 21/78 726/9 |
| 2014/0006898 A1* | 1/2014 | Sharon ............... H03M 13/356 714/755 |
| 2014/0095827 A1* | 4/2014 | Wei ..................... G06F 12/0246 711/203 |
| 2015/0067349 A1* | 3/2015 | Werner ................. G06F 21/602 713/189 |
| 2017/0308464 A1* | 10/2017 | Hwang ................. G06F 3/0604 |
| 2018/0253467 A1* | 9/2018 | Gurajada ............ G06F 11/1471 |
| 2018/0295115 A1* | 10/2018 | Kumar ................ H04L 67/1097 |

OTHER PUBLICATIONS

Yu Wang, Qiang Miao, Eden W. M. Ma, Kwok-Leung Tsui and Michael G. Pecht, "Online Anomaly Detection for Hard Disk Drives Based on Mahalanobis Distance," IEEE Transactions on Reliability, Mar. 2013, pp. 136-145, vol. 62, No. 1, IEEE.

* cited by examiner

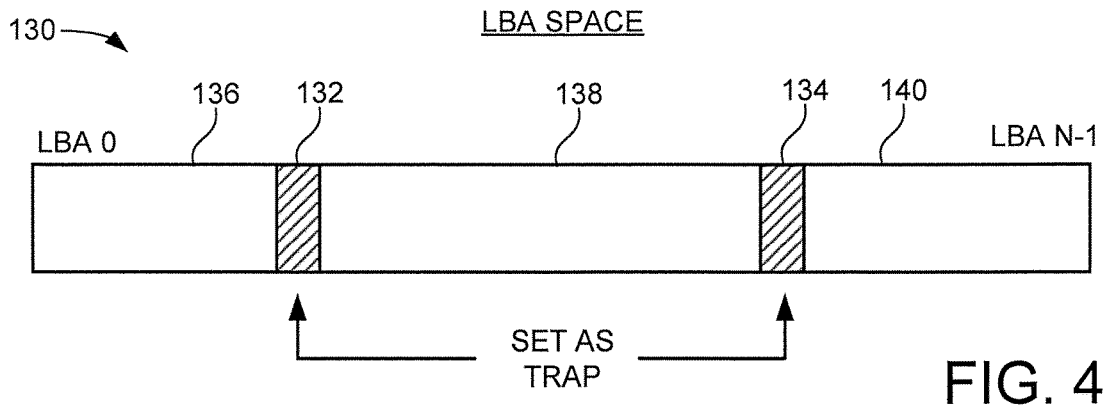
FIG. 4
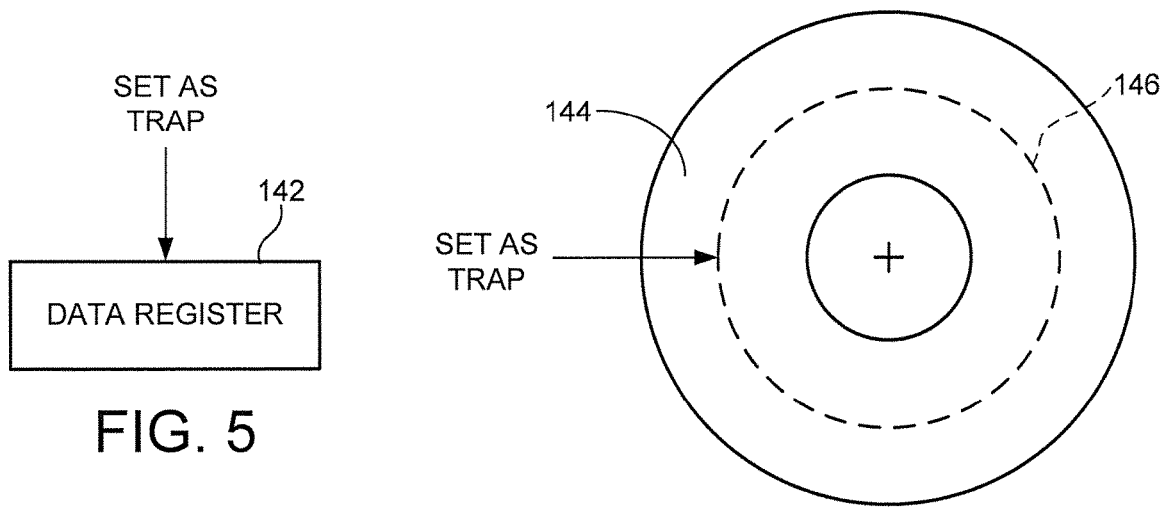
FIG. 5
FIG. 6
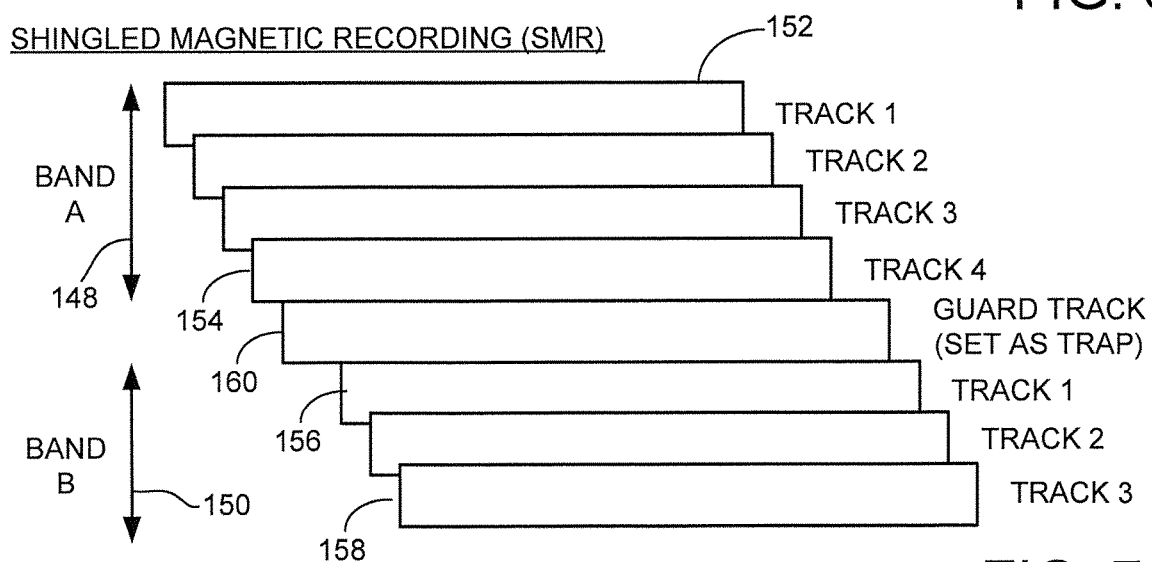
FIG. 7

SOLID STATE DRIVE (SSD)

HARD DISC DRIVE (HDD)

HYBRID SOLID STATE DRIVE (HSSD)

STORAGE DEVICE MEMORY

US 10,824,367 B2

ADAPTIVE INTRUSION DETECTION BASED ON MONITORED DATA TRANSFER COMMANDS

SUMMARY

Various embodiments of the present disclosure are generally directed to cryptographic processing systems, such as but not limited to a data storage environment.

In some embodiments, a data storage device has a non-volatile memory (NVM). A device controller circuit services data transfer commands received from a host device to transfer data between the host device and the NVM. A security controller circuit monitors the received data transfer commands and enacts a change in security policy to implement one or more intrusion traps associated with the NVM in response to the received data transfer commands. The intrusion traps constitute memory locations that are configured to normally store user data, but are not normally accessed during the servicing of the currently received data transfer commands.

These and other features which characterize various embodiments of the present disclosure can be understood in view of the following detailed discussion and the accompanying drawings.

BRIEF DESCRIPTION OF THE DRAWINGS

FIG. 4 shows an LBA space of the data storage device arranged in some embodiments.

FIG. 5 shows a data register of the storage device in some embodiments.

FIG. 6 shows a data track of a rotatable medium of the storage device in some embodiments.

FIG. 7 shows shingled magnetic recording (SMR) bands of the storage device in some embodiments.

DETAILED DESCRIPTION

Figure 1:
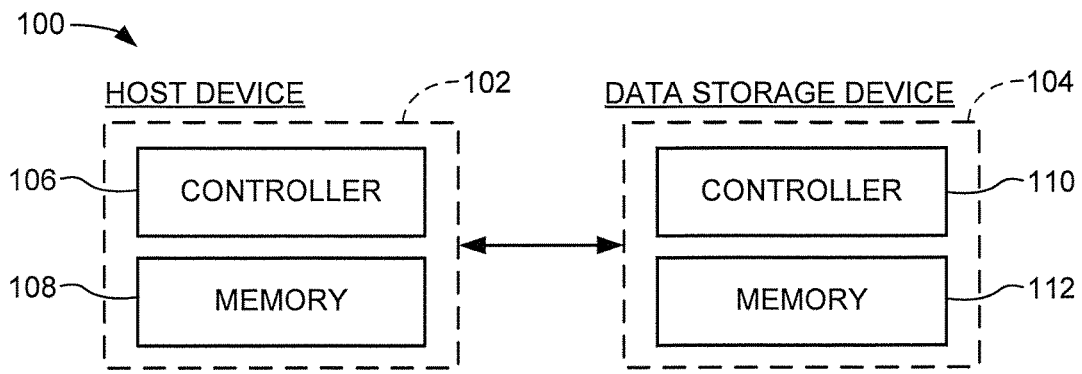
FIG. 1 is a functional block representation of a data processing system which operates in accordance with various embodiments of the present disclosure.

Data security schemes are used to restrict access to digital data processing systems by unauthorized users. Data security schemes can employ a variety of cryptographic security techniques such as data encryption and data security protocols.

A particularly useful form of data security protocol is sometimes referred to as an intrusion trap or "honey pot." An intrusion trap may be established as a region of physical, logical and/or virtual memory and associated resources that appears to be a legitimate portion of the memory system, but is isolated and monitored in such a way as to attract and/or block the actions of an attacker. In some cases, counterfeit data and/or resources can be provisioned within the intrusion trap to enable system administrators to observe the behavior of an attacker and take corrective actions as required.

While operable, there remains a continued need for improvements in the area of data security to detect and reduce unauthorized access in a data storage environment. Accordingly, various embodiments of the present disclosure are generally directed to an apparatus and method for intrusion detection in a data processing system.

As explained below, some embodiments present a data storage device having a non-volatile memory (NVM) adapted to store and retrieve user data. A controller circuit is provided to process data transfer commands from a host device to transfer data between the NVM and the host device. A security manager circuit is configured to monitor the data transfer commands and to enact a change in security policy to implement at least one session-specific intrusion trap associated with the NVM in response to the monitored data transfer commands.

The intrusion trap(s) can be implemented in a variety of ways. Certain storage bands or ranges of logical addresses (e.g., logical block address, LBA) may be selected as one or more intrusion traps. Other traps may be based on detecting accesses to unused memory or particular registers in the system. While dummy regions that do not normally store user data can be configured as an intrusion trap, in many cases the intrusion traps may be normal data storage locations that are otherwise used to store and/or process user data.

Some embodiments may involve using a heuristic approach to adaptively select a trap based on the current workload. Factors can include the types, frequency, sources, etc. of currently received data transfer commands received by the storage device. A memory location is selected as an intrusion trap on the basis that that memory location would not normally be expected to be accessed during the current workload. For example, a workload dominated by sequential writes would normally require access to certain bands, ranges, registers or other locations. These locations would tend to be different from those accessed during other types of workloads, such as one dominated by random I/O accesses.

The system may be configured to detect the receipt of specific commands at a time when such commands would not normally be expected based on the current workload, and such anomalous commands can be used to identify and establish a suitable intrusion trap. Accesses to specific physical locations in memory that are not normally accessed by a user, such as particular tracks (e.g., guard tracks between shingled magnetic recording or SMR bands), can also be used in some embodiments to establish a suitable intrusion trap.

Once an intrusion trap is established, the system monitors for apparent accesses by a user to the intrusion trap. A number detection actions are contemplated to confirm an intrusion event is taking place. In some cases, a threshold number of accesses to an intrusion trap once an intruder is detected can be used before declaring an actual intrusion event has taken place. A moving window approach can be used so that the number of attacks per unit time is monitored in order to declare an intrusion event.

Different modes can be enacted to provide different levels of intrusion traps depending on the detected circumstances. Host managed traps can be implemented where the host device has control over the creation of the traps and actions taken to detect and counteract intrusions. Device (drive) managed traps can be implemented where the drive handles the traps in a manner transparent to the host device. Host assisted traps can be used where the host is notified of the traps and assists in preventing access to the various locations. These various modes can be used in combination as required.

In this way, the various embodiments endeavor to detect intruders through the adaptive implementation of intrusion traps based on workload. Once an intrusion event is confirmed, various suitable defensive mechanisms are triggered such as monitoring, logging, lockout, crypto erase, etc.

These and other features and advantages of various embodiments can be understood beginning with a review of FIG. 1 which shows a data processing device 100. The data processing system 100 includes a host device 102 operably coupled to a data storage device 104. This is merely exemplary as any number of different types of data processing environments can be used as desired, including environments that do not involve data storage systems.

The host device 102 and the data storage device 104 in FIG. 1 can each take a variety of forms. Without limitation, the host device 102 may take the form of a personal computer, workstation, server, laptop, portable handheld device, smart phone, tablet, gaming console, RAID controller, etc. The data storage device 104 may be a hard disc drive (HDD), solid-state drive (SSD), hybrid solid state drive (HSSD), thumb drive, optical drive, an integrated memory module, a multi-device storage enclosure, etc. The data storage device 104 may be incorporated into the host device as an internal component or may be an external component accessible via a communication pathway with the host device 102 including a cabling connection, a wireless connection, a network connection, etc.

For purposes of the present discussion, it will be contemplated that the host device 102 is a computer and the data storage device 104 provides a main memory store for user data generated by the host device. The host device 102 includes a host controller 106 and local host memory 108. In this example context, the host controller 106 is a programmable processor circuit that executes an operating system (OS) resident in the memory 108, as well as one or more applications accessed through a user interface (not separately shown).

The data storage device 104 includes a storage device controller 110 and storage memory 112 (non-volatile memory, or NVM). The storage device controller 110 is a control circuit that provides top level control of the storage device and operates to schedule and direct execution of data access commands from the host device 102 to transfer user data between the storage memory 112 and the local host memory 108.

The storage device controller 110 can be realized as a system on chip (SOC) integrated circuit device of the storage device 104. The controller may include one or more programmable processor circuits that execute firmware (FW) programming stored in the memory 112. Additionally or alternatively, the controller may include one or more non-programmable hardware circuits such as ASICs (application specific integrated circuits), FPGAs (field programmable gate arrays), gate logic, etc. arranged to carry out various functions.

It is contemplated that the data processing system 100 incorporates one or more data security schemes to protect the system from unwanted access by unauthorized third parties. The data security scheme(s) may take a variety of forms, including modules that control access to the host and to the storage device. A variety of cryptographic functions, such as but not limited to encryption systems and security protocols, may be used to protect user data stored in the data storage memory 112 as well as in other storage locations within the device 100.

Figure 2:
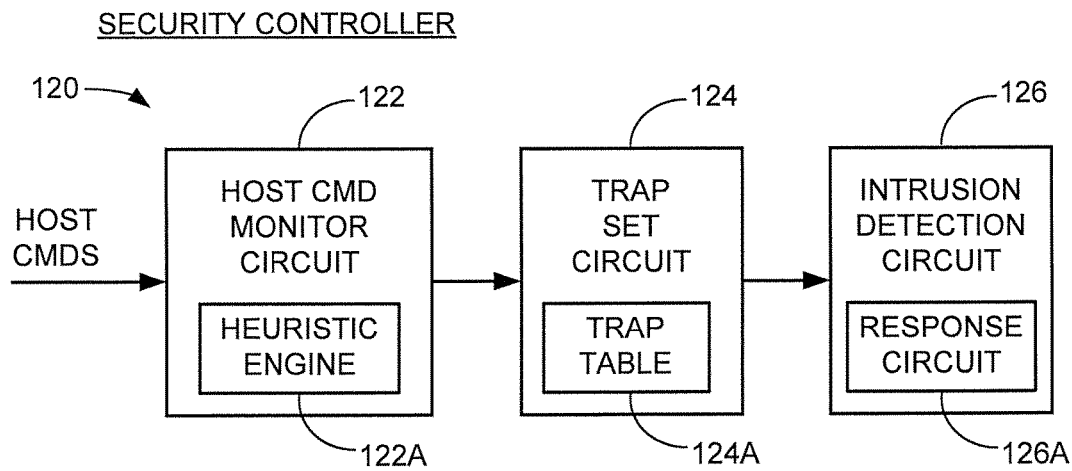
FIG. 2 shows a configuration of a security controller circuit of the data storage device of FIG. 1 in accordance with some embodiments.

FIG. 2 is a functional block diagram of relevant aspects of the data storage device 104 in accordance with some embodiments. A security controller 120 represents hardware and/or programmable processor circuitry of the controller 104 that operates to establish adaptive intrusion traps, confirm intrusion events and, as necessary, take protective actions to protect the user data stored by the NVM 112. The security controller 120 includes a host command monitor circuit 122, a trap set circuit 124 and an intrusion detection circuit 126.

The host command monitor circuit 122 monitors externally issued and received commands, such as commands from the host device 102 to transfer data to and/or from the NVM 112. Heuristic methods may be used by a heuristic engine circuit 122A to classify a given workload environment in real time from a number of predetermined selections or combinations, such as write dominated, read dominated, sequential, random, etc. Other workload environment classifications may be directed to user identification, band accesses, LBA ranges, etc. associated with such transfer commands. Still other workload environment classifications may relate to security authentication operations (e.g., requests for challenge values, etc.), diagnostic operations, upgrades, requests for logged (e.g., SMART) data, etc. that have been requested by the host device.

The trap set circuit 124 selects one or more memory locations of the data storage device 104 to operate, on a temporary basis, as an intrusion trap in relation to the characterized workload. As noted above, the intrusion trap(s) may be selected in view of memory location(s) that would not normally be accessed in view of the characterized workload. In some cases, a trap table 124A may be utilized as a data structure stored in a memory location. The trap table may identify a combination of intrusion traps that can be selected based on a given workload identified by the monitor circuit 122.

The intrusion detection circuit 126 generally operates to subsequently monitor the intrusion traps in an effort to detect attempted accesses. Different configurations of operation for the circuit are discussed below depending on the circumstances. Once an intrusion event is confirmed, the circuit 126 further operates to select and implement appropriate preventative action, as indicated by response circuit 126A.

Figure 3:
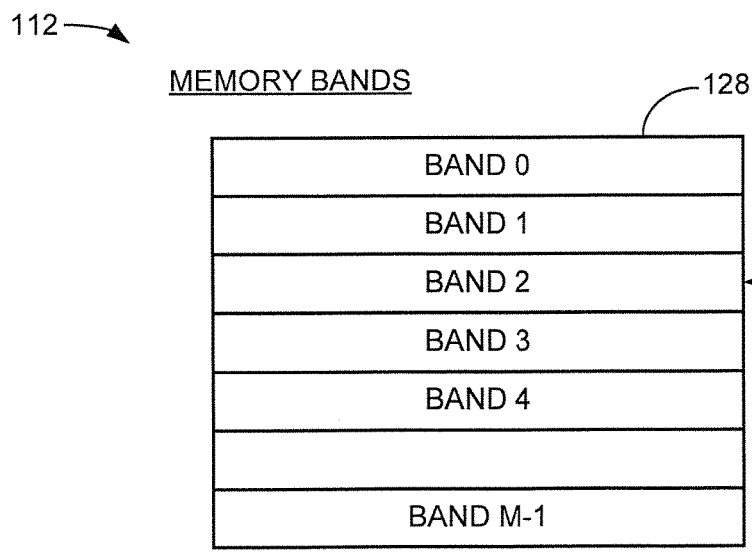
FIG. 3 illustrates an arrangement of a memory space of the data storage device into bands in some embodiments.

Various types of traps that may be selected and implemented by the trap set circuit 124 will now be discussed beginning with FIG. 3, which shows the NVM 112 of FIG. 1 divided up into a plural number M bands 128. The bands may be physical regions of storage to which certain data blocks may be written, or may be configured in other ways (e.g., dummy bands, virtual bands, etc.). The bands may be contiguous or non-contiguous.

It is contemplated in this embodiment that the data storage device 104 is configured as a self-encrypting drive (SED) that operates in a trusted computing group (TCG) environment. This arranges the drive capacity into the individual bands 128, with each band having a unique identifier (ID) value and password or other security feature to enable user access through the use of TCG commands. Data in each band are encrypted using one or more cryptographic encryption keys, and the keys may be stored elsewhere within the device 104. In some cases, the data stored in each band uses a different encryption key or other data protection mechanism.

One or more of the bands 128 are selected as an intrusion trap. This selection may be based on the granting of access to a different band or sets of bands. For example, if an authorized user is granted access to bands 1 and 4, band 2 may be selected as an intrusion trap. Not all of the non-authorized bands (e.g., bands 1-3, M-1, etc.) need be selected as an intrusion trap. It is sufficient to select at least one of the non-authorized bands since an intruder will not know which band(s) are a trap. A random number generator or sequence table can be used to select different bands during different sessions.

FIG. 4 shows another basis upon which intrusion traps may be set. An LBA space 130 represents the available logical block addresses (LBAs) in the system. Other forms of logical addresses may be used. The space 130 covers a total of N sequentially enumerated blocks (LBAs) from LBA 0 to LBA N-1. Host access commands may denote certain LBAs or ranges of LBAs as part of the commands (e.g., "read LBA X").

In FIG. 4, an access policy can be set based on selected memory ranges, such as respective LBA ranges 132 and 134. Attempts to write data to or read data from the LBAs in ranges 132, 134 would be detected as violation of the policy. Accesses would be permitted to the remainder of the LBA space (regions 136, 138 and/or 140). The trap ranges 132, 134 may be selected by the trap set circuit 124 based on a determination by the monitor circuit that localized LBA accesses are being carried out that are restricted to another logically distant region, such as sequential or random I/O operations to the lower portion of region 136.

Variations on this LBA based trap approach can include selection of particular cylinder/head/sector (CHS) combinations as a trap; selection of individual data sectors that are not logically mapped to the address space as a trap; selection of sectors beyond the maximum LBA as a trap; selection of drive reserve (e.g., spare or overprovisioned) sectors as a trap; and selection of corrupted sectors which have been marked as permanently defective (bad) sectors as a trap. Attempts to access these or other memory locations can be viewed as an access attempt for further analysis.

Based on the complexity of the heuristic algorithms employed by the engine 122A, other variations can involve establishing a run-time trap that evaluates a user data access pattern over time to define anomalous patterns. For example, if certain repetitive sequences are observed by the monitor circuit 122, the trap set circuit 124 may designate other data locations or values that are not part of the established sequence as a trap.

In a related embodiment, the drive 104 can be arranged as an object based storage device in which the data stored by the device are managed as objects. Each object has a key value pair. The host can access the data by providing the key to the device. Certain objects can be designated as intrusion traps in both a host managed or drive managed environment based on the sequence of objects being accessed by an authorized user.

FIG. 5 shows a data register 142, such as a volatile hardware register, available for use by the controller 110 (FIG. 1) during data transfer operations with the NVM 112. The data register may be utilized during some forms of data accesses, but not others. For example, sequential accesses (such as sequential writes or sequential reads) operate to write or read data in LBA sequential order to the NVM 112, while random I/O operations randomly operate upon different LBAs in no particular order. Data registers such as 142 that are configured to buffer sequential data may not be generally employed by the storage device 104 during a random I/O workload. In this case, the data registers would be suitable memory locations to monitor during random I/O workload environments. Other volatile and non-volatile memory locations can be configured as intrusion traps in like manner.

FIG. 6 shows a rotatable data recording medium 144 characterized as a rotatable magnetic data storage disc. In disc-based storage devices such as HDDs and hybrid devices, one or more such discs are axially aligned and rotated at a selected velocity by a spindle motor to provide an NVM store. Data are written to and read from concentric tracks defined on the disc surfaces using an array of data read/write transducers (not shown).

In some cases, selected data tracks such as 146 can be selected as a suitable intrusion trap. The track 146 may be a normal data track that otherwise stores a number of LBAs (sectors) of user data. Randomly generated trap tracks may be selected across the radial extent of the disc 144. Data aging characteristics of the data stored to the track may be selected; for example, tracks having cold data that have not been accessed for an extended period of time may be identified as suitable candidates as intrusion traps.

It is contemplated that the tracks in FIG. 6 are normal (non-overlapping) tracks. FIG. 7 shows another embodiment in which shingled magnetic recording (SMR) tracks are arranged into a number of bands. Two such bands A and B are shown at 148, 150. Band A has an initial track 152 and a final track 154. Band B has an initial track 156 and a final track 158. The bands are separated by a guard track 160.

Each band of tracks 148, 150 is made up of successively written tracks that partially overlap each preceding track, so that the band is written in succession. This reduces the overall storage space of each band, but generally requires the entire band of data to be rewritten to update portions of the band. The guard track 160 does not normally store user data, but instead serves as a separation boundary between the respective bands. Certain types of control data can be written to the guard track, however, such as mapping data, etc.

Any number of tracks can be placed in each band. In some cases the bands are of variable length based on the size of data sets. In other cases, each band has a nominally common data storage capacity, such as 256 MB, etc. Logical bands are mapped to the physical bands in the system.

In SMR drives, some or all of the disc capacity of the drive is divided into bands as shown. The host can send commands to the drive as such as close band, open band, finish band, reset zone etc. In some cases, the drive selects one or more bands as trap bands that can either be drive managed or host managed. In other cases, the various guard bands such as 160 can be selected as intrusion traps in cases where the guard bands are not normally accessed during data transfer operations. An adversary will not be aware of the SMR band-based traps and will trigger the traps when trying to scan the drive.

Figure 8:
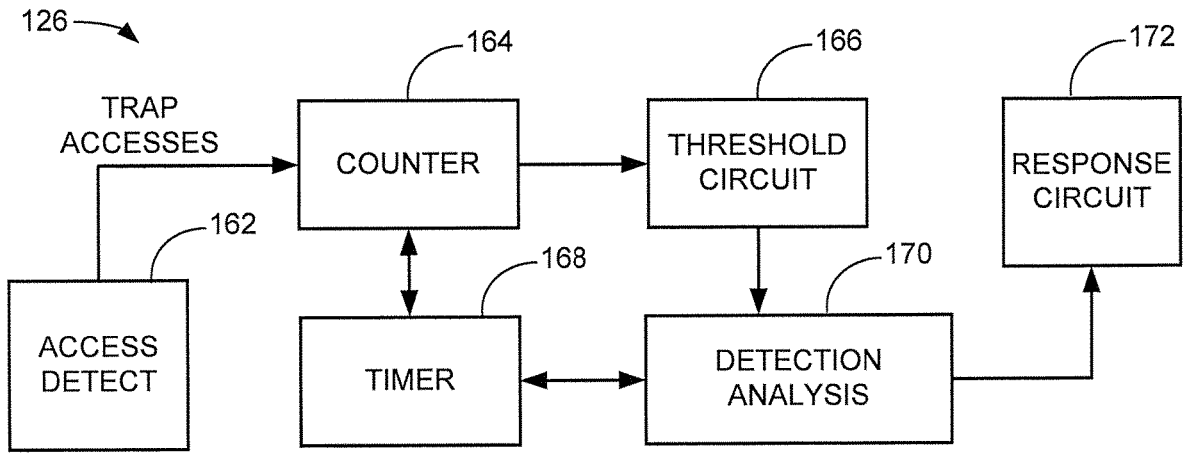
FIG. 8 shows the intrusion detection circuit of FIG. 2 in accordance with some embodiments.

FIG. 8 shows a functional block representation of the intrusion detection circuit 126 of FIG. 2 in accordance with some embodiments. It will be recalled that, once one or more intrusion traps have been implemented by the monitor circuit 122 and the trap set circuit 124, the intrusion detection circuit 126 operates to monitor the trap(s) for accesses and, as necessary, take appropriate corrective action.

In some cases, the detection circuit 126 notifies the system of every access that occurs with a trap. However, more complex processing is contemplated in which multiple trap accesses are detected and evaluated before declaring and acting upon an intrusion event.

Such qualification of accesses is based at least in part on the fact that the selection of the intrusion traps is adaptive and prospective; the traps are generally established on currently observed host access/command patterns, with a view toward identifying, in real time, unlikely memory locations that will be accessed in the near future based on the current workload. However, because workloads can quickly change based on host need, incorporating some amount of hysteresis in the system may be advantageous to enable the system to determine whether the accesses to the intrusion traps are due to an unauthorized attacker or a stepwise change in authorized user workload.

Thus, unlike traditional honey pot implementations where designated areas of memory are specifically configured to attract and fool attackers, the security controller 120 instead operates as a background routine to adaptively monitor commands/accesses to regions of memory that should not normally be accessed in the near future based on the currently observed workload. The locations and designations of the traps will change substantially as quickly as changes are detected in the authorized workload.

With reference to FIG. 8, The circuit FIG. 8 includes an access detect circuit 162 which monitors the intrusion trap(s) identified and set by the trap set circuit 124. In some cases, the access detect circuit 162 monitors the physical memory location or operative elements (e.g. heads, queues, etc.) to detect actual accesses to the respective traps. In other cases, the access detect circuit 162 evaluates the pending commands via addresses or other information associated with the commands to determine whether, should the command be executed, the associated intrusion trap would be accessed.

Actual access to the intrusion trap location may be specifically denied by the circuit 126 such as by placing a hold on the associated command. However, because the security controller 120 is a background operation, the controller may rely on other security aspects of the device (e.g., encryption, password protection, authentication routines, etc.) to protect the data in the intrusion trap, so that the access detect circuit 162 merely notes the occurrence of a trap access (which includes a trap access attempt).

In cases where multiple trap accesses are required to declare an intrusion event, a counter circuit 164 is incremented responsive to each detected trap access. The accumulated count is evaluated by a threshold circuit 166, which compares the accumulated count to a predetermined maximum threshold. A timer circuit 168 can be employed to reset the counter 166 at appropriate times. A detection analysis circuit 170 evaluates the state of the system to determine whether to declare an intrusion event has taken place.

A number of algorithms can be implemented to declare an intrusion event. In some embodiments, a maximum number n of accumulated trap accesses, such as ten accesses (n=10) can be used. In other cases, a moving window based algorithm can be used based on a moving time window, such as a number m accumulated trap accesses over a selected time period t (e.g., t=5 minutes, etc.).

Another approach is to detect the total number of unique traps that have been accessed, so that is a number p of different trap accesses (e.g., different logical bands, LBAs, SMR bands, etc.) have occurred, the event is declared. The threshold values and/or the algorithm used can change based on different detected command workloads (e.g., writes, reads, sequential, random). These and other approaches are particularly suited to thwarting scans and other operations to detect the contents and structure of the drive.

All intrusions can be given the same weight, or different intrusions can be divided into different threat levels such as low, medium or high. For example, attempts to access a bank of encryption keys, registers, guard regions, etc. may be deemed to present a greater threat than accesses to other memory locations. Different thresholds or weighting can be applied to differentiate among these threat levels.

FIG. 8 further shows a response circuit 172 of the intrusion detection circuit 126. The response circuit 172 operates once the detection analysis circuit 170 has determined that there is a sufficient likelihood of an intrusion that an intrusion event is declared.

Figure 9:
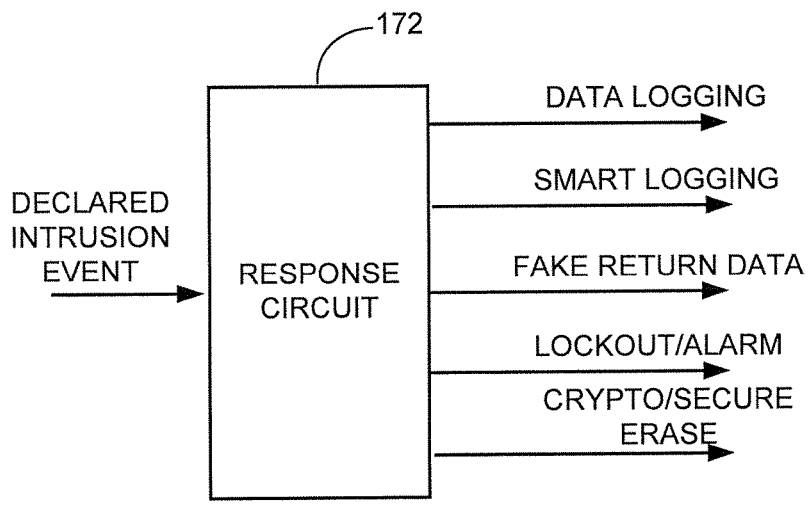
FIG. 9 illustrates operation of the response circuit of FIG. 8 in some embodiments.

As shown by FIG. 9, the response circuit 172 can perform a number of response operations in view of the declared intrusion event. The operations range from least severe to most severe from a user standpoint. Multiple responses can be concurrently taken. The exemplary responses shown in FIG. 9 include data logging, SMART (reliability data) logging, presenting and returning fake data, performing a lockout of the device and/or generating a notification alarm, and performing cryptographic and/or secure erasure of the data on the drive. Other actions can be taken so this listing is merely exemplary and is not limiting.

Logging activity generally involves operation of the drive to log some number (e.g., a few hundred) commands that have been received after the intrusion event has been declared. This provides forensic information that may assist an analysis of the attack, including a forensic investigation of the intended target during the attack.

SMART logging (Self-Monitoring Analysis and Reporting Technology) logs reliability data associated with the intrusion. This can include a record of how many times intrusions were detected over a selected period to evaluate intrusion patterns over time.

The use of fake data can be to return fake (falsified or dummy) data in response to the anomalous command(s) associated with the intrusion event. Pre-defined meaningful data patterns could be generated and transferred to the intruder, so that the intruder is at least initially unaware that the attack has been detected and thwarted, thereby wasting resources during the attempt. Notification of the exchange can be provided to an authorized user.

Lockout involves a temporarily shut down of further access to the drive by a user until reset by an authorized party. The lockout can be on a per-user basis in a shared drive, or the entirety of the drive to all user(s). An alarm provides notification of the attack to an appropriate authority that can take appropriate actions as required. This may involve an external interrupt being forwarded to the host operating system (OS), which can in turn ping a network administrator of the detected event.

Crypto/secure erase results in loss of the data on the drive (e.g., destruction of encryption keys, overwriting and erasure of existing data multiple times, etc.). This is carried out in high threat level situations, since the data stored to the drive will not be subsequently recoverable. Either destructive or non-destructive erasure can be used as desired.

Figure 10:
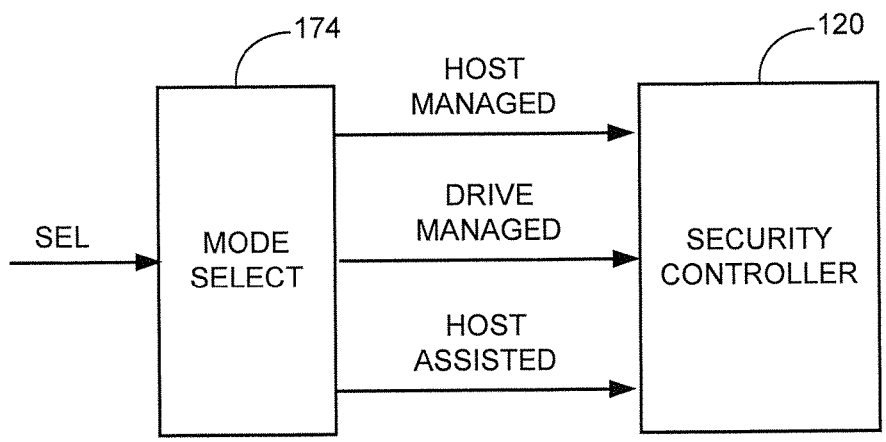
FIG. 10 shows different modes of operation selectable in accordance with some embodiments.

The designation and monitoring of various intrusion traps can be carried out during different operational modes. FIG. 10 shows a mode selection circuit 174 of the storage device 104 that interfaces with the security controller 120. The mode selection circuit 174 selects among various options including host managed, drive managed and host assisted modes. Different security configurations (e.g., different traps, different thresholds, different responses, etc.) may be utilized during each of these modes.

In host managed mode, the host is provided with an API (application interface) access to the drive, enabling the host to have control over the creation of traps and actions that are taken. A secure user authentication process is used to confirm access to this mode. The drive managed mode operates independently of and without knowledge by the host device that the traps have been set and are being monitored.

The host assisted mode, also referred to as a host aware mode, the host is made aware of the traps that the drive has created and will endeavor to prevent a user from accessing such traps. Certain types of attacks such as crypto locker attacks can be thwarted using this model. In some cases, the drive and host OS can generate certain files as a trap. Once crypto locker malware attempts to encrypt these files, the operation will be detected and the drive can signal the OS of an intrusion, enabling the OS to block the process attempting the cyber encryption.

Figure 11:
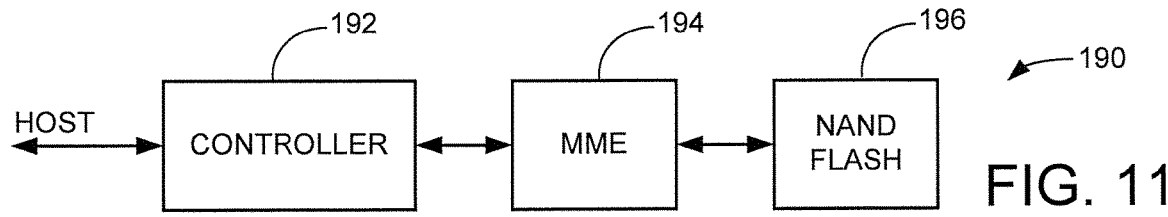
FIG. 11 is a functional block representation of the data storage device of FIG. 1 arranged as a solid state drive (SSD).
Figure 12:
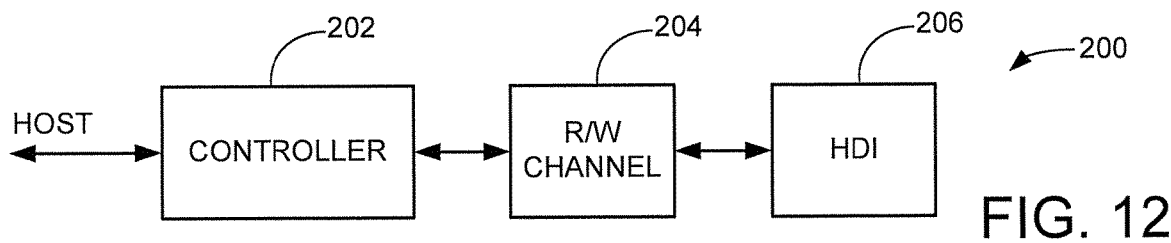
FIG. 12 is a functional block representation of the data storage device of FIG. 1 arranged as a hard disc drive (HDD).
Figure 13:
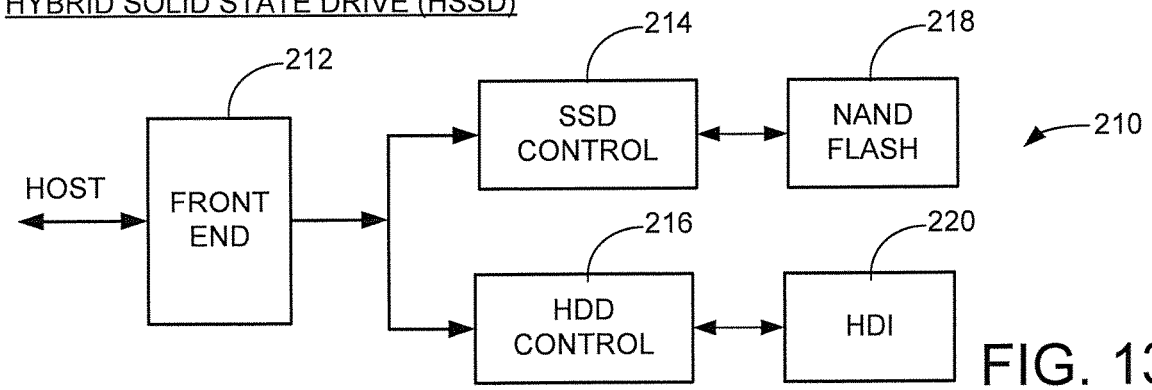
FIG. 13 is a functional block representation of the data storage device of FIG. 1 arranged as a hybrid solid state drive (HSSD).

FIGS. 11-13 show further details regarding various types of storage devices (drives) that can incorporate the security controller 120. FIG. 11 shows a solid state drive (SSD) 190 having an SSD controller 192, a memory management electronics (MME) circuit 194 and a NAND flash array 196.

The controller 192 is a control circuit that may be realized in hardware or as one or more programmable processors. The controller 192 controls transfers to and from the NAND flash 196 as carried out by driver and processing circuitry of the MME 194. Other aspects may include local data buffers, cache memory, registers, hardware assist circuits, etc. The security controller 120 can be incorporated into the functionality of the SSD controller 192 to detect accesses to memory locations of the MME 194, flash 196 and elsewhere.

FIG. 12 is a simplified functional representation of a hard disc drive (HDD) 200. The HDD uses rotatable magnetic recording storage as discussed above in FIGS. 5-6 and includes an HDD controller 202, a read/write (R/W) channel 204 and a head/disc interface (HDI) 206. Other aspects not shown may include a servo control circuit, hardware registers, data buffers, etc. As before, the HDD controller 202 may be hardware and/or programmable processor based control circuit and may incorporate the security controller 120.

FIG. 13 shows a layout for a hybrid drive 210, which incorporates solid-state semiconductor memory such as the NAND flash in the SSD 190 and rotatable media such as in the HDD 200. A front end controller 212 directs respective SSD and HDD controller circuits 214, 216 to exchange data with a NAND flash array 218 and an HDI 220. As before, the various controllers constitute control circuits that may be hardware and/or processor based.

Figure 14:
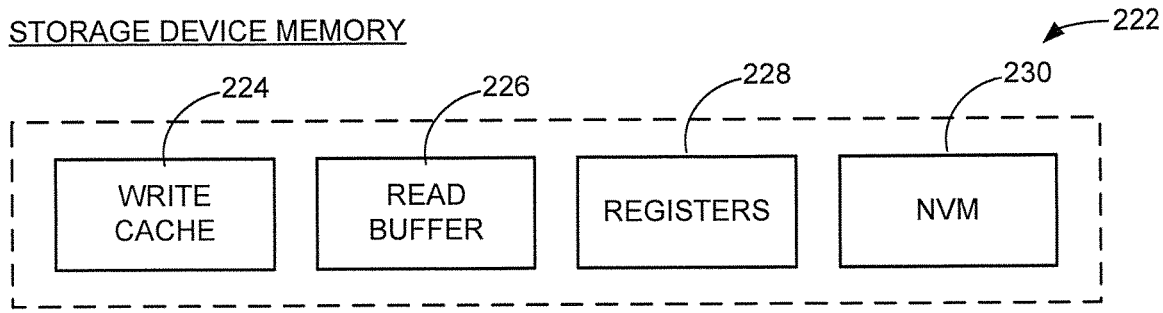
FIG. 14 is a functional block representation of memory of the data storage device of FIG. 1.

FIG. 14 shows further aspects of a storage device memory 222 that may be designated as one or more intrusion traps. The memory 222 may be incorporated in any of the SSD, HDD or hybrid devices and includes a write cache 224, a read buffer 226, various registers 228 and non-volatile memory (NVM) 230. Portions of each of these and other forms of data storage device memory can be designated as an intrusion trap in accordance with the foregoing discussion.

Figure 15:
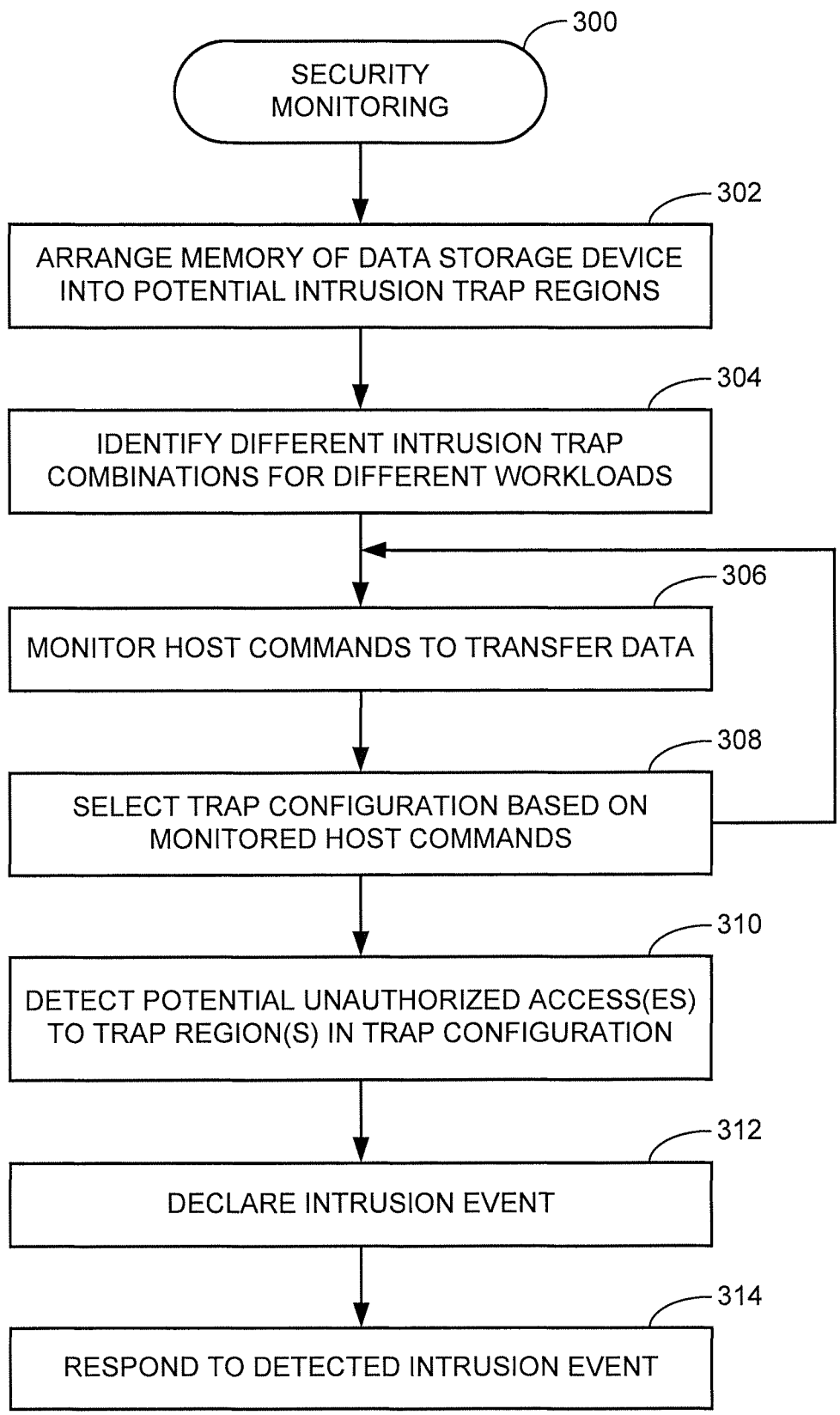
FIG. 15 is a flow chart for a security monitoring routine illustrative of steps carried out by the security controller in accordance with some embodiments.

FIG. 15 is a flow chart for a security monitoring routine 300 illustrative of steps that may be carried out in accordance with some embodiments using the security controller 120. As shown in FIG. 15, the routine begins at step 302 by arranging one or more memory locations of a data storage device into potential intrusion traps. These may include the various memory locations discussed above in FIGS. 3-7 and 11-14.

At step 304, different combinations of the intrusion traps are identified as suitable for use in view of different types of host workload environments. As discussed above, substantially any number of different types of commands can be grouped together to define a different workload profile. Examples include and are not limited to read dominated environments where a significant majority of the operations are read commands, write dominated environments where the significant majority of the operations are write commands; LBA or band specific accesses; sequential (read or write) accesses; random accesses; diagnostic accesses; authentication accesses; upgrade accesses (e.g., to install new controller firmware, etc.), logged data accesses, etc.

The operation of step 304 may include an evaluation of the internal operations by the drive in servicing each of these and other types of environments. In some cases, a lookup table such as 124A in FIG. 2 can be arranged to identify the suitable combinations of intrusion traps that can be implemented for each of the various different workload profiles.

At step 306, normal drive operation is commenced and the monitor circuit 122 operates to monitor various host commands including host commands to transfer data between the host command and the NVM of the device. Based on such monitoring, the monitor circuit 122 selects a workload profile and the trap set circuit 124 implements an associated set of intrusion traps suitable for the workload profile at step 308. In some cases, a default trap configuration may be set and implemented either absent an existing workload or in cases of an indeterminate state.

At step 310, potential unauthorized accesses are detected by the intrusion detection circuit 126. As noted above, in some cases a single access (including an attempted access) to an intrusion region will be sufficient to signal an intrusion, but in other cases some hysteresis is applied to the system to accumulate multiple accesses before declaring an intrusion event, step 312. Based on a declared event, one or more suitable response actions are taken at step 314.

Figure 16:
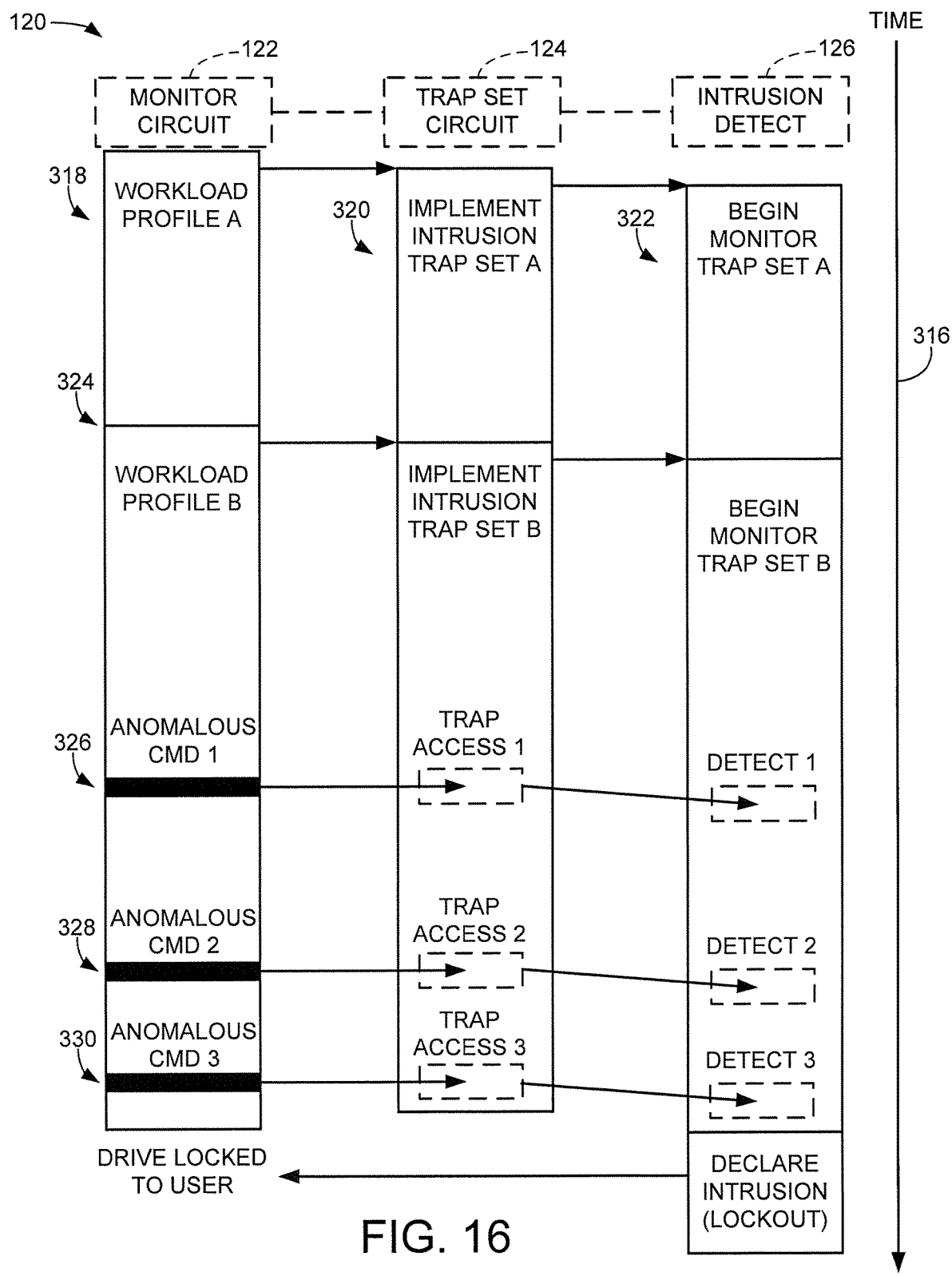
FIG. 16 shows a timing sequence diagram to illustrate operation of the routine of FIG. 15 in some embodiments.

FIG. 16 presents a simplified timing sequence diagram to further illustrate aspects of the routine 300 in FIG. 15. The passage of elapsed time is signified by arrow 316. Sequential operations by each of the monitor circuit 122, the trap set circuit 124 and the intrusion detection circuit 126 of the security controller 120 are represented by respective columns 318, 320 and 322.

Initially, a first set of workload commands (Profile A) are presented to the storage device 104 by one or more users/hosts, as indicated in column 318. These are characterized to implement a first intrusion trap set (Trap Set A), column 320.

In turn, the intrusion detection circuit 126 begins monitoring the first intrusion trap set as shown in column 322.

A subsequent transition in workload profile type is detected at 324 in column 320. It will be appreciated that host commands will tend to be presented to the drive in any desired order, type and frequency, so that clear demarcations between different types of workloads may not be immediately detectable. Nevertheless, history heuristics can be applied to constantly evaluate the commands being issued to the drive so that, at some point, the monitor circuit 122 can affirmatively declare a new workload profile has been engaged (Profile B). This results in the selection of a second set of intrusion traps (Trap Set B) which is monitored by the detection circuit 126 as shown.

It will be recalled that the respective profiles represent a succession of host commands which are serviced by the storage device 104 during a normal mode of operation. The commands will primarily represent data transfer (access) commands to write data to and/or read data from the NVM 112 of the device 104, although other forms of host commands can be included. The processing of these workload commands is carried out by remaining aspects of the drive.

Continuing with FIG. 16, a first anomalous command (CMD 1) is received at 326 during Profile B. This first command can take any number of types. The first command is configured to access one of the intrusion traps (Trap 1) implemented in Trap Set B. The diagram in FIG. 16 indicates that this intrusion trap access is detected and accumulated by the intrusion detection circuit 126. The command is described as an anomalous command because it may not be immediately clear whether the command is simply a valid command from an authorized user, or represents an attack by an unauthorized party.

FIG. 16 further shows that during continued processing of the workload, a second anomalous command (CMD 2) is provided and detected at 328, and a third anomalous command (CMD 3) is provided at detected at 330. These commands may be the same as, or different from, the first anomalous command. The commands may be simply accumulated as discussed above in FIG. 8, or may be further evaluated with a view toward detecting a pattern that indicates an attack is underway.

Regardless, the simplified diagram in FIG. 16 shows that upon detection of the third anomalous command, the response circuit 172 of the intrusion detection circuit 126 operates to declare an intrusion event and takes action to lock out the current user. This brings the continued processing of the workload to a halt. As noted above, this is merely illustrative as other forms of responses may be taken, including enabling the workload to proceed while other suitable actions are carried out.

It is to be understood that even though numerous characteristics and advantages of various embodiments of the present disclosure have been set forth in the foregoing description, this description is illustrative only, and changes may be made in detail, especially in matters of structure and arrangements of parts within the principles of the present disclosure to the full extent indicated by the broad general meaning of the terms wherein the appended claims are expressed.

What is claimed is:

1. A data storage device comprising:
a non-volatile memory (NVM);
a device controller circuit configured to service data transfer commands received from a host device to transfer data between the host device and the NVM;
a data register arranged as a volatile memory buffer; and
a security controller circuit configured to enact a change in security policy to implement at least one intrusion trap associated with the NVM responsive to the received data transfer commands, the at least one intrusion trap not normally accessed during the servicing of the data transfer commands by the device controller circuit, the security controller circuit further configured to determine the received data transfer commands conform to a first selected one of sequential I/O accesses or random I/O accesses, wherein the data register is used to store data during only a second selected one of the sequential or random I/O accesses, and wherein the security controller circuit selects the data register as one of the at least one intrusion trap responsive to the first selected one of the sequential or random I/O accesses being different from the second selected one of the sequential or random I/O accesses.

2. The data storage device of claim 1, wherein the security controller circuit comprises a host command monitor circuit configured to monitor the data transfer commands and select a workload profile corresponding to the data transfer commands from among a plurality of available workload profiles, and wherein at least one of the plurality of available workload profiles comprises sequential I/O accesses with the NVM and at least one of the plurality of available workload profiles comprises random I/O accesses with the NVM.

3. The data storage device of claim 1, wherein the security controller circuit further comprises an intrusion detection circuit configured to detect accesses to the at least one intrusion trap, to declare an intrusion event as an indication that an unauthorized party is likely attacking the data storage device to gain unauthorized access thereto, and to perform at least one response operation responsive to the declared intrusion event.

4. The data storage device of claim 1, wherein the security policy specifies a first set of intrusion traps associated with memory locations of the data storage device configured to store user data responsive to a first detected workload profile of host data transfer commands, wherein the security policy specifies a different, second set of intrusion traps associated with memory locations of the data storage device configured to store user data responsive to a different, second detected workload profile of host data transfer commands, wherein the security controller circuit implements the first set of intrusion traps responsive to an indication that a first set of the host data transfer commands conform to the first workload profile, and wherein the security controller circuit subsequently implements the second set of intrusion traps and releases the first set of intrusion traps responsive to an indication that a second set of the host data transfer commands received immediately following the first set of the host data transfer commands conform to the second workload profile.

5. The data storage device of claim 1, wherein the data storage device is characterized as a self-encrypting drive with the total data capacity of the NVM divided into a plurality of bands, each band having an associated subtotal data capacity of the NVM for storing user data encrypted using a separate encryption key and user access parameters, and wherein the at least one intrusion trap comprises a selected one of the plurality of bands.

6. The data storage device of claim 1, wherein the NVM is configured to store data blocks having logical addresses that sequentially range from a minimum logical address value to a maximum logical address value, wherein the data transfer commands are associated with a first subrange of the logical addresses, and wherein at least one of the intrusion traps comprises a different second subrange of the logical addresses.

7. The data storage device of claim 1, wherein the NVM comprises at least one rotatable data recording medium on which a plurality of concentric tracks are defined to store user data, and wherein the at least one intrusion trap comprises at least one track of the plurality of concentric tracks.

8. The data storage device of claim 1, wherein the security controller circuit comprises a detection circuit that detects a plurality of accesses to the at least one intrusion trap, accumulates a count of the plurality of accesses to form an accumulated count value, compares the accumulated count value to a predetermined threshold, declares an intrusion event responsive to the accumulated count value reaching or exceeding the predetermined threshold, and performs a corrective action responsive to the declared intrusion event.

9. The data storage device of claim 8, wherein the corrective action comprises at least a selected one of a data logging operation, accumulation of reliability data associated with the data storage device, a transfer of falsified data to a requesting party associated with the plurality of accesses, a lock out operation to restrict further access to the data storage device, generation of an alarm, a cryptographic erase of encrypted data by destroying an encryption key associated with data stored by the NVM, or a secure erasure of the NVM.

10. The data storage device of claim 1, characterized as a selected one of a solid state drive (SSD), hard disc drive (HDD) or hybrid drive.

11. A method comprising:
coupling a data storage device to a host device, the data storage device comprising a non-volatile memory, a device controller circuit and a security controller circuit;
servicing, by the device controller circuit, data transfer commands received from the host device to transfer data between the host device and the NVM; and
implementing, by the security controller circuit, at least one intrusion trap associated with the NVM responsive to the received data transfer commands, the at least one intrusion trap not normally accessed during the servicing of the data transfer commands by the device controller circuit, the at least one intrusion trap implemented by monitoring the received data transfer commands, selecting a workload profile from among a plurality of available workload profiles where the selected workload profile corresponds to the received data transfer commands, selecting the at least one intrusion trap responsive to the selected workload profile where each intrusion trap corresponds to a different memory location of the data storage device, monitoring the received data transfer commands for accesses to each of the different memory locations, and identifying an intrusion event responsive to an accumulated number of the accesses, wherein at least one of the plurality of available workload profiles comprises sequential I/O accesses with the NVM and at least one of the plurality of available workload profiles comprises random I/O accesses with the NVM, and wherein at least one of the intrusion traps for each of the plurality of available workload profiles comprises a portion of the NVM configured to store user data not normally accessed responsive to the associated workload profile.

12. The method of claim 11, wherein the implementing step further comprises declaring an intrusion event by an unauthorized attacker responsive to at least one detected access of the at least one intrusion trap, and performing at least one response action to thwart the intrusion event by the unauthorized attacker.

13. The method of claim 12, wherein the at least one response action comprises a cryptographic or secure erasure of at least a portion of the NVM.

14. The method of claim 11, wherein the implementing step further comprises perform at least one response operation responsive to the declared intrusion event.

15. The method of claim 11, wherein the data storage device is characterized as a self-encrypting drive with the total data capacity of the NVM divided into a plurality of bands, each band having an associated subtotal data capacity of the NVM for storing user data encrypted using a separate encryption key and user access parameters, and wherein the at least one intrusion trap comprises a selected one of the plurality of bands.

16. The method of claim 11, wherein the NVM is configured to store data blocks having logical addresses that sequentially range from a minimum logical address value to a maximum logical address value, wherein the monitored data transfer commands are associated with a first subrange of the logical addresses, and wherein at least one of the intrusion traps comprises a different second subrange of the logical addresses.

17. A data storage device comprising:
a non-volatile memory (NVM);
a device controller circuit configured to service data transfer commands received from a host device to transfer data between the host device and the NVM; and
a security controller circuit configured to select a first set of intrusion traps for a first workload comprising sequential I/O data transfer commands and a different, second set of intrusion traps for a second workload comprising random I/O data transfer commands, to detect a transition between the first and second workloads, to implement the associated first or second set of intrusion traps responsive to the transition between the first and second workloads, each of the first and second sets of intrusion traps comprising different combinations of data memory locations in the NVM not normally used to service the data transfer commands during the respective first and second workloads, and to detect an unauthorized intrusion event by monitoring accesses to the respective data memory locations in the NVM associated with the implemented first or second set of intrusion traps.

18. The data storage device of claim 17, wherein the security controller circuit implements the associated first or second set of intrusion traps by monitoring a first set of the received data transfer commands to detect the transition between the first and second workloads, monitoring a subsequent second set of the received data transfer commands for accesses to the data memory locations in the associated first or second set of intrusion traps, and identifying the unauthorized intrusion event responsive to an accumulated number of the accesses.

19. The data storage device of claim 17, wherein at least a selected one of the first and second sets of intrusion traps further comprises a data register not used during a selected one of the first or second workloads.

20. The data storage device of claim 19, characterized as a solid-state drive (SSD).

* * * * *